US011540004B2

United States Patent
Yao

(10) Patent No.: US 11,540,004 B2
(45) Date of Patent: Dec. 27, 2022

(54) METHODS, APPARATUSES, COMPUTER-READABLE STORAGE MEDIA AND ELECTRONIC DEVICES FOR VIDEO PLAYBACK

(71) Applicant: HANGZHOU HIKVISION SYSTEM TECHNOLOGY CO., LTD., Hangzhou (CN)

(72) Inventor: Jiazhen Yao, Hangzhou (CN)

(73) Assignee: Hangzhou Hikvision System Technology Co., Ltd.

( * ) Notice: Subject to any disclaimer, the term of this patent is extended or adjusted under 35 U.S.C. 154(b) by 0 days.

(21) Appl. No.: 17/262,620

(22) PCT Filed: Sep. 24, 2019

(86) PCT No.: PCT/CN2019/107446
§ 371 (c)(1),
(2) Date: Jan. 22, 2021

(87) PCT Pub. No.: WO2020/063567
PCT Pub. Date: Apr. 2, 2020

(65) Prior Publication Data
US 2021/0152878 A1    May 20, 2021

(30) Foreign Application Priority Data
Sep. 28, 2018   (CN) .......................... 201811142279.1

(51) Int. Cl.
*H04N 21/432* (2011.01)
*G06F 16/732* (2019.01)
(Continued)

(52) U.S. Cl.
CPC ....... *H04N 21/4325* (2013.01); *G06F 16/732* (2019.01); *H04N 21/47217* (2013.01); *H04N 21/8456* (2013.01)

(58) Field of Classification Search
CPC ......... H04N 21/4325; H04N 21/47217; H04N 21/8456; G06F 16/732
See application file for complete search history.

(56) References Cited

U.S. PATENT DOCUMENTS

| | | | |
|---|---|---|---|
| 2014/0270708 A1* | 9/2014 | Girgensohn | H04N 9/79 386/282 |
| 2014/0379873 A1 | 12/2014 | Biderman et al. | |
| 2016/0066007 A1 | 3/2016 | Zhang | |

FOREIGN PATENT DOCUMENTS

| | | |
|---|---|---|
| CN | 102884786 | 1/2013 |
| CN | 103491450 | 1/2014 |

(Continued)

OTHER PUBLICATIONS

CN Office Action issued in Chinese Appln. No. 2018111422791, dated Jul. 24, 2020, 16 pages (With English Translation).

(Continued)

*Primary Examiner* — Girumsew Wendmagegn
(74) *Attorney, Agent, or Firm* — Fish & Richardson P.C.

(57) ABSTRACT

The present disclosure provides video playback methods and apparatuses, computer-readable storage media, and electronic devices for video playback, which may reduce the search waiting time for a user during video playback. The video playback method may include: determining a time range for an initial incremental search according to a target playback timing retrieving a video file in each of the at least two search segments in a search sequence determined according to a preset search rule in a way that when a video file is retrieved from one of the at least two search segments, determining whether the video file satisfies a playback condition, when the video file satisfies the playback condition, playing the video file, and, when retrieving video file from one of the search segments is completed, continuing to (Continued)

retrieve a video file from a remaining search segment that has not been searched in the search sequence.

13 Claims, 5 Drawing Sheets

(51) Int. Cl.
    *H04N 21/472*     (2011.01)
    *H04N 21/845*     (2011.01)

(56) References Cited

FOREIGN PATENT DOCUMENTS

| | | |
|---|---|---|
| CN | 103841465 | 6/2014 |
| CN | 103873819 | 6/2014 |
| CN | 103974013 | 8/2014 |
| CN | 105227930 | 1/2016 |
| CN | 107205174 | 9/2017 |
| CN | 108076376 | 5/2018 |
| CN | 108174132 | 6/2018 |
| CN | 108289194 | 7/2018 |
| EP | 0999504 | 5/2000 |
| KR | 20160104231 | 9/2016 |
| WO | 2007034206 | 3/2007 |
| WO | WO-2007034206 A1 * | 3/2007 ............. G06F 16/54 |

OTHER PUBLICATIONS

PCT International Search Report in International Appln. No. PCT/CN2019/107446, dated Dec. 20, 2019, 6 pages (With English Translation).

Extended European Search Report issued in European Appln. No. 19865930.2, dated Aug. 17, 2021, 9 pages.

PCT International Written Opinion in International Appln. No. PCT/CN2019/107446, dated Dec. 20, 2019, 9 pages (With English Translation).

* cited by examiner

METHODS, APPARATUSES, COMPUTER-READABLE STORAGE MEDIA AND ELECTRONIC DEVICES FOR VIDEO PLAYBACK

CROSS-REFERENCE TO RELATED APPLICATIONS

This application is a National Stage application under 35 U.S.C. § 371 of International Application No. PCT/CN2019/107446, having an International Filing Date of Sep. 24, 2019, which claims priority to Chinese Application Serial No. 201811142279.1, filed on Sep. 28, 2018. The disclosures of the prior applications are considered part of the disclosure of this application, and are incorporated in their entireties into this application.

TECHNICAL FIELD

The present disclosure relates to digital surveillance technologies, and in particular to methods and apparatuses, computer-readable storage media and electronic devices for video playback.

BACKGROUND

In the field of surveillance, video playback is an important technology. In related art, playback of a video file generally requires a user to specify a search range, and then the video file in the search range is retrieved from a device or a storage medium, and the retrieved video file is played after the video file in the range is wholly retrieved.

In the above method, during playback, the retrieved video file could be played only when the video file of the search range has been wholly retrieved. This will cause the user to wait for a long search time and cause a poor user experience in playback.

SUMMARY

In view of the above, the present disclosure provides methods and apparatuses, computer-readable storage media and electronic devices for video playback.

In a first aspect, embodiments of the present disclosure provide a video playback method, including: determining a time range for an initial incremental search according to a target playback timing and a preset search parameter, wherein the time range includes at least two search segments, retrieving a video file in each of the at least two search segments in a search sequence determined according to a preset search rule in a way that when a video file is retrieved from one of the at least two search segments, determining whether the video file satisfies a playback condition, when the video file satisfies the playback condition, playing the video file, and when retrieving video file from one of the search segments is completed, continuing to retrieve a video file from a remaining search segment that has not been searched in the search sequence.

According to the methods, during video playback, when a video file is retrieved from a search segment and is determined as satisfying a playback condition, it will start to play the video file with continuing to retrieve a video file in a search segment that has not been searched in the time range of the initial incremental search. That is, retrieving video file is accompanied with playing video file, rather than playing the video file is started after the video file in the search range is wholly retrieved. Therefore, the embodiments of the present disclosure may reduce the search waiting time for the user during video playback.

In a second aspect, embodiments of the present disclosure provide a video playback apparatus, including: a search range determining module configured to determine a time range for an initial incremental search according to a target playback timing and a preset search parameter, wherein the time range includes at least two search segments; and a retrieving and playing module configured to retrieve a video file in each of the at least two search segments in a search sequence determined according to a preset search rule in a way that, when a video file is retrieved from one of the at least two search segments, determine whether the video file satisfies a playback condition, when the video file satisfies the playback condition, play the video file, and when retrieving video file from one of the search segments is completed, continue to retrieve a video file from a remaining search segment that has not been searched in the search sequence.

In a third aspect, embodiments of the present disclosure provide a computer-readable storage medium having a computer program stored thereon, wherein when executed by a processor, the computer program implements the method of the first aspect.

In a fourth aspect, embodiments of the present disclosure provide an electronic device including a memory, a processor, and a computer program stored on the memory and executable by the processor, when executing the computer program, the processor performs the method of the first aspect.

DETAILED DESCRIPTION OF THE EMBODIMENTS

Figure 1:
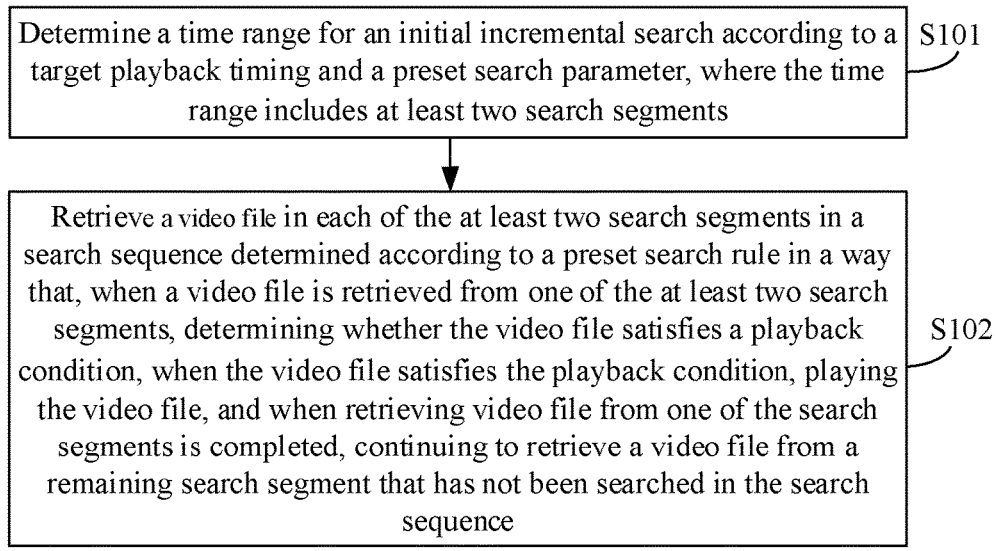
FIG. 1 is a schematic flowchart of a video playback method according to an embodiment of the disclosure.

Examples are described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

The embodiments of the present disclosure are clearly and completely described below in conjunction with the accompanying drawings.

Referring to FIG. 1, an embodiment of the present disclosure provides a video playback method, which may be applicable to an electronic device, such as a mobile phone, a tablet computer, a personal computer (PC), or the like, and the method may include the following steps.

S101, a time range for an initial incremental search is determined according to a target playback timing and a preset search parameter, where the time range includes at least two search segments.

The search parameter may include: a number of search segments and a duration of each of the search segments. The search parameter may be set by the user or a default value, which is not limited in the embodiments of the present disclosure.

The target playback timing may be obtained by receiving a user instruction.

S102, a video file is retrieved in each of the at least two search segments in a search sequence determined according to a preset search rule in a way that, when a video file is retrieved from one of the at least two search segments, determining whether the video file satisfies a playback condition, when the video file satisfies the playback condition, playing the video file, and when retrieving video file from one of the search segments is completed, continuing to retrieve a video file from a remaining search segment that has not been searched in the search sequence.

Determining whether the video file satisfies the playback condition may include:

if the video file is retrieved in a search segment where the target playback timing is located, it is determined that the video file satisfies the playback condition; or if the video file is not retrieved in the search segment where the target playback timing is located, but the video file is retrieved in a search segment in a playback direction (the playing direction includes forward or reverse), it is determined that the video file satisfies the playback condition; or if the video file is not retrieved in the search segment where the target playback timing is located, and the video file is not retrieved in each of the search segments in the playback direction, but the video file is retrieved in a search segment in a direction opposite to the playback direction, it is determined that the video file satisfies the playback condition.

The principle of playing back a video file may be as follows.

A video file in the search segment where the target playback timing is located is played back first; then, a video file in a search segment closest to the target playback timing in the playback direction is played back; after that, a video file in a search segment closest to the target playback timing in a direction opposite to the playback direction is played back.

When playing back the video file in the search segment in the direction opposite to the playback direction, the playback position may be determined according to the length of the video file. For example, the preset playback length of the video file is 10 minutes, if the length of the video file is shorter than the preset playback length i.e., 10 minutes, the entire video file is played back; if the length of the video file is longer than 10 minutes, a position in the video file having a distance of 10 minutes to the target playback timing is determined as a start for playback.

When the video file is not found in the search segments in the time range of the initial incremental search, a prompt may also be given to remind the user.

According to the embodiments of the present disclosure, during video playback, the search range may be automatically calculated according to the target playback timing, and the search range may be divided into multiple search segments without specifying the search range; when a video file is retrieved from a search segment and is determined as satisfying a playback condition, it will start to play the video file with continuing to retrieve a video file in a search segment that has not been searched in the time range of the initial incremental search. That is, retrieving video file is accompanied with playing video file, rather than playing the video file is started after the video file in the search range is wholly retrieved. Therefore, the embodiments of the present disclosure may reduce the search waiting time for the user during video playback.

In a possible implementation, step S101 of determining the time range for the initial incremental search according to the target playback timing and the preset search parameter may include:

determining a begin time and an end time of the first search segment where the target playback timing is located based on the target playback timing and the preset duration of each search segment;

determining a begin time and an end time of a remaining search segment according to the begin time and the end time of the first search segment, the preset number of search segments, the preset duration of each search segment, and the preset search rule.

The preset search rule may indicate that the first search segment is taken as a center, and the search segments are to be searched in a crossing order of first rightward and then leftward; or the preset search rule indicates that the first search segment is taken as a center, and the search segments are to be searched in a crossing order of first leftward and then rightward.

The time range of the initial incremental search may also be determined in other ways. For example, centering on the clock of the target playback timing, the begin time and the end time of each search segment in the time range of the initial incremental search is determined according to the preset number of search segments and the preset duration of each search segment.

In a possible implementation, determining the begin time and the end time of the first search segment where the target playback timing is located based on the target playback timing and the preset duration of each search segment may include:

calculating according to a first formula to obtain the begin time of the first search segment;

calculating according to a second formula to obtain the end time of the first search segment.

The first formula may be the following formula (1):

$$\text{PlayTimeBegin} = \lfloor \text{(hours of PlayTime)}/M \rfloor * M \quad (1)$$

The second formula may be the following formula (2):

$$\text{PlayTimeEnd} = \lfloor \text{(hours of PlayTime)}/M \rfloor * M + M \quad (2)$$

Where, PlayTimeBegin represents the begin time of the first search segment, PlayTimeEnd represents the end time of the first search segment, "PlayTime hours" represents the hour reading of the target playback timing, M represents the duration of search segment, and $\lfloor \ldots \rfloor$ represents an operation of rounding down.

For example: if the duration of each search segment M=6, and the target playback timing PlayTime=13:30, the begin time of the first search segment PlayTimeBegin=$\lfloor 13/6 \rfloor *6$=12, the end time of the first search segment PlayTimeEnd=$\lfloor 13/6 \rfloor *6+6$=18.

In a possible implementation, the first search segment is the 1st search segment, and determining begin time and end time of a remaining search segment according to the begin time and the end time of the first search segment, a preset number of search segments, the preset duration of each search segment, and the preset search rule may include:

for a Kth search segment, where $1 < K \leq N$, and N is the number of search segments, determining whether the Kth search segment is earlier than the first search segment based on the preset search rule;

if the Kth search segment is earlier than the first search segment, calculating according to a third formula and a fourth formula to obtain the begin time and the end time of the Kth search segment respectively, where the third formula may be the following formula (3):

$$\text{the begin time of the Kth search segment} = \text{PlayTimeBegin} - \lfloor K/2 \rfloor * M \quad (3)$$

the fourth formula may be the following formula (4):

$$\text{the end time of the Kth search segment} = \text{PlayTimeBegin} - (\lfloor K/2 \rfloor - 1) * M \quad (4)$$

if the Kth search segment is later than the first search segment, calculating according to a fifth formula and a sixth formula to obtain the begin time and the end time of the Kth search segment respectively, where the fifth formula may be the following formula (5):

$$\text{the begin time of the Kth search segment} = \text{PlayTimeEnd} + (\lfloor K/2 \rfloor - 1) * M \quad (5)$$

the sixth formula may be the following formula (6):

$$\text{the end time of the Kth search segment} = \text{PlayTimeEnd} + \lfloor K/2 \rfloor * M \quad (6)$$

where PlayTimeBegin represents the begin time of the first search segment, PlayTimeEnd represents the end time of the first search segment, M represents the duration of search segment, and $\lfloor \ldots \rfloor$ represents an operation of rounding down.

Figure 2:
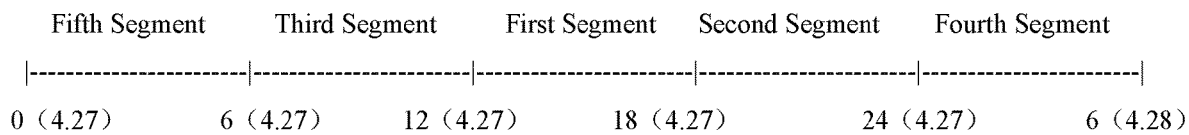
FIG. 2 is a first schematic diagram of an arrangement sequence and the time ranges of search segments in a time range of an initial incremental search.

For example: if the number of search segments N=5 and the duration of each search segment M=6, the preset search rule indicates that the first search segment is taken as a center, and the search segments are to be searched in a crossing order of first rightward and then leftward, that is, searching the search segments in a crossing order of first searching right search segment and then searching left search segment. The target playback timing PlayTime=2018/4/27 13:30, current time Cur Time=2018/4/27 13:31, then according to the above formulas (1) and (2) it may be calculated that PlayTimeBegin=12, PlayTimeEnd=18; according to the above formulas (3) and (4), it may be calculated that the begin time of the third search segment=12-$\lfloor 3/2 \rfloor *6$=6, the end time of the third search segment=12-$(\lfloor 3/2 \rfloor -1)*6$=12, in the same way, it may be calculated that the begin time of the fifth search segment=0 and the end time of the fifth search segment=6; according to the above formulas (5) and (6), it may be calculated that the begin time of the second search segment=18+$(\lfloor 2/2 \rfloor -1)*6$=18, the end time of the second search segment=18+$\lfloor 2/2 \rfloor **6$=24, in the same way, it may be calculated that the begin time of the fourth search segment=24, and the end time of the fourth search segment=30 (that is, 6 o'clock on April 28). The first search segment may be referred to as the first segment for short, the second search segment may be referred to as the second segment for short, and so on, the sequence and time range of the search segments calculated above may be shown in FIG. 2.

The begin time and the end time of each search segment may by calculated according to other calculation formulas. For example, the means of rounding up may be used. At this time, the begin time of the first search segment PlayTimeBegin may be calculated by PlayTimeBegin=$\lceil ((\text{PlayTime hours}))/M \rceil *M - M$, the end time PlayTimeEnd may be calculated by PlayTimeEnd=$\lceil ((\text{PlayTime hours}))/M \rceil *M$, where $\lceil \ldots \rceil$ represents an operation of rounding up.

In a possible implementation, the method may further include: after the time range of the initial incremental search is determined, a state of each search segment is marked, where the state of the search segment includes: searched, being searched, or unsearched.

The rules for marking the state of the search segment in the embodiment of the present disclosure may be the following methods.

For the time period that has become the history, when the search for a search segment is completed, the search segment is marked as searched; the future search segment and the search segments that have not been searched are marked as unsearched; the search segment that is searched while recorded is marked as being searched.

Figure 3:
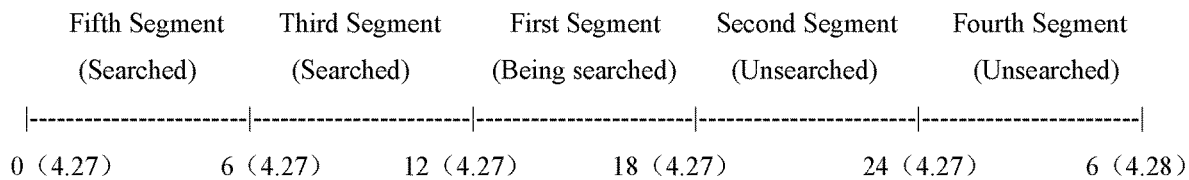
FIG. 3 is a schematic diagram of states of the search segments shown in FIG. 2 after an incremental search is completed.

Still taking the above data as an example, the target playback timing PlayTime=2018/4/27 13:30, and the current time Cur Time=2018/4/27 13:31. When an incremental search is completed, as shown in FIG. 3, the states of the third and fifth segments is marked as searched, the state of the first segment is marked as being searched, and the states of the second and fourth segments are marked as unsearched.

Figure 4:
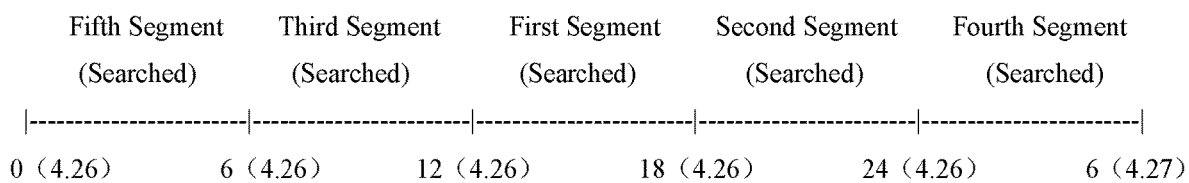
FIG. 4 is a second schematic diagram of an arrangement sequence, time ranges and states of search segments in a time range of an initial incremental search.

For another example, if the target playback timing PlayTime=2018/4/26 13:30, the current time Cur Time=2018/4/27 13:31, the number of search segments N=5, the duration of the search segment M=6, and the preset search rule indicates that the first search segment is taken as a center, and the search segments are to be searched in a crossing order of first rightward and then leftward. Referring to the calculation method of the previous examples, it may be calculated that the begin time of the first segment=12, the end time of the first segment=18, the begin time of the second segment=18, the end time of the second segment=24, the begin time of the third segment=6, the end time of the third segment=12, the begin time of the fourth segment=24, the end time of the fourth segment=30 (that is, 6 o'clock on April 27), the begin time of the fifth segment=0, and the end time of the fifth segment=6. When an incremental search is completed, the states of the first to fifth segments are all marked as searched, and the arrangement sequence, time range and state of each search segment are shown in FIG. 4.

In a possible implementation, the method may further include: performing a search on a search segment marked as being searched at a predetermined time interval (for example, 30 s), and updating the video file of the search segment after the search is completed.

For example, the automatic search mechanism may be used to play back real-time recording, alarm linkage recording, etc.

As such, real-time recordings may be searched out in time, and related recordings that the user cares about may be played back, thereby improving the user playback experience.

In a possible implementation, the method may further include: every time after a search segment has been searched, updating a video bar of the search segment and displaying it on a user interface.

For example, the unsearched part on the video bar is gray. When the search for a search segment is completed, the search segment on the video bar may be highlighted for display. For the search segment with a state of being searched, the searched part of the search segment on the video bar is highlighted, and the part in the future time (that is, not yet recorded) is still gray.

In a possible implementation, the method may further include:

determining a critical timing for triggering a new incremental search;

detecting whether a relocated playback timing exceeds the critical timing;

when the relocated playback timing exceeds the critical timing, determining a relocated time range of the new incremental search according to the relocated playback timing and the preset search parameter;

determining whether an intersection exists between the time range of the new incremental search and the time range of a previous incremental search;

if the intersection exists, retrieving a video file from a relocated search segment that has not been searched according to the preset search rule;

if the intersection does not exist, retrieving a video file from all relocated search segments according to the preset search rule.

The relocated critical timing may be a timing in the search segment. For calculation convenience, for example, it may be middle timing of a search segment or begin time of a search segment or end time of the search segment.

The relocated playback timing may be obtained by receiving a user instruction, or may be the current playback timing obtained during playback.

Figure 5:
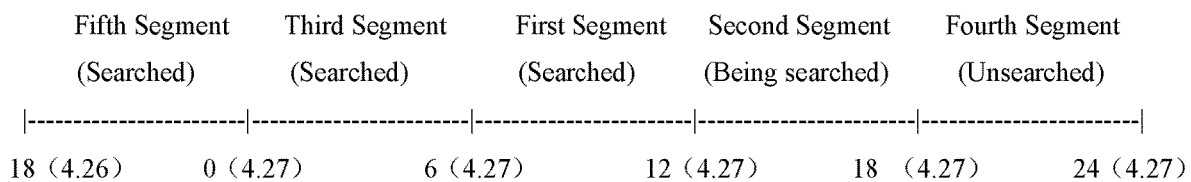
FIG. 5 is a first schematic diagram of an arrangement sequence, time ranges, and states of search segments in a time range of the incremental search after relocation in the embodiment of the disclosure.

Specifically, assuming that the search segments of the initial incremental search are as shown in FIG. 3 above, the relocated playback timing is 2018/4/27 7:30, and the current time Cur Time=2018/4/27 13:31, it may be calculated that a relocated time range for the first segment is 6-12 o'clock, a relocated time range for the second segment is 12-18 o'clock, a relocated time range for the third segment is 0-6 o'clock, and a relocated time range for the fourth segment is 18-24 o'clock, a relocated time range for the fifth segment is 18-24 o'clock the previous day (that is, 18:00 on April 26 to 0 o'clock on April 27). Compared with the search ranges of the initial incremental search shown in FIG. 3, the search ranges of the two incremental searches have an intersection. The first and third segments of the relocated search segments of the new incremental search have been searched, so it is not necessary to search the first and third segments again. The second segment is being searched, and the fourth segment is in the future time period and not available for search, so only the fifth segment is to be searched for the video file. When search for the fifth segment is completed, the state of the fifth search segment may be marked as searched. At this time, the arrangement sequence, the time range, and the state of each search segment of the new incremental search are shown in FIG. 5.

Figure 6:
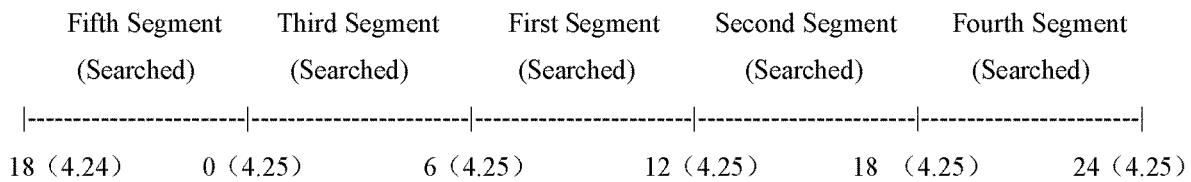
FIG. 6 is a second schematic diagram of an arrangement sequence, time ranges, and states of search segments in a time range of the incremental search after relocation in the embodiment of the disclosure.

For another example, assuming that the search segments of the initial incremental search are as shown in FIG. 4 above, and the playback timing after relocation is 2018/4/25 7:30, the current time Cur Time=2018/4/27 13:31, it may be calculated that the time range of the first segment after relocation is 6-12 o'clock on April 25, and the time range of the second segment is 12-18 o'clock on April 25, the time range of the third segment is 0-6 o'clock on April 25, the time range of the fourth segment is 18-24 o'clock on April 25, the time range of the fifth segment is 18-24 o'clock the previous day (that is, 18:00 on April 24 to 0 o'clock on April 25). Compared with the search range of the initial incremental search shown in FIG. 4, there is no intersection between the search ranges of the two figures, and the relocated first to fifth segments of the new incremental search need to be searched. When the search is completed, the states of the search segments may be marked as searched. At this time, the arrangement sequence, the time range and the state of each search segment of the new incremental search are shown in FIG. 6.

In the methods, a relocation search mechanism is provided to ensure that the relevant video that the user is interested may be searched out, and after triggering relocation, no search is performed for the search segments that have been searched, so system resources may be saved.

Figure 7:
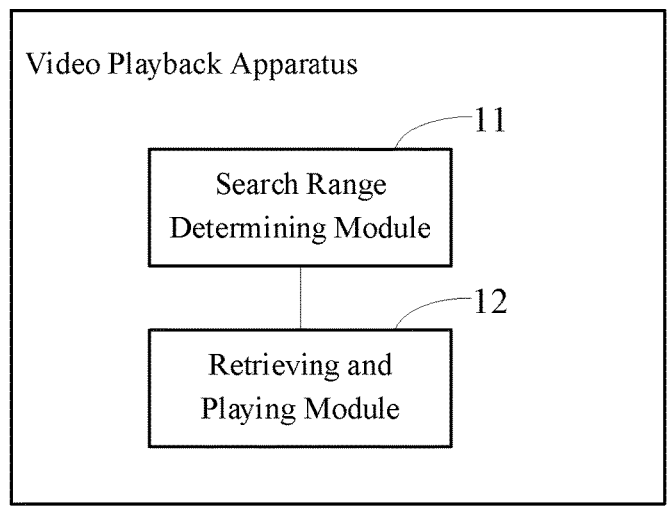
FIG. 7 is a block diagram of a first structure of a video playback apparatus according to an embodiment of the disclosure.

Based on the same inventive concept, referring to FIG. 7, an embodiment of the present disclosure provides a video playback apparatus. The device may include a search range determining module 11 and a retrieving and playing module 12.

The search range determining module 11 may be configured to determine a time range for an initial incremental search according to a target playback timing and a preset search parameter, wherein the time range includes at least two search segments.

The retrieving and playing module 12 may be configured to retrieve a video file in each of the at least two search segments in a search sequence determined according to a preset search rule in a way that, when a video file is retrieved from one of the at least two search segments, determine whether the video file satisfies a playback condition, when the video file satisfies the playback condition, play the video file, and when retrieving video file from one of the search segments is completed, continue to retrieve a video file from a remaining search segment that has not been searched in the search sequence.

The search parameter may include: a number of search segments and a duration of search segment.

In a possible implementation, the search range determining module 11 may be configured to: determine, based on the target playback timing and the preset duration of search segment, a begin time and an end time of a first search segment where the target playback timing is located, and determine, according to the begin time and the end time of the first search segment, the preset number of search segments, the preset duration of search segment and the preset search rule, a begin time and an end time of the remaining search segment.

The preset search rule may indicate that the first search segment is taken as a center, and the search segments are to be searched in a crossing order of first rightward and then leftward, or the preset search rule may indicate that the first search segment is taken as a center, and the search segments are to be searched in a crossing order of first leftward and then rightward.

In a possible implementation, the search range determining module 11 may be configured to: obtain the begin time of the first search segment where the target playback timing is located based on a first formula (1); obtain the end time of the first search segment where the target playback timing is located based on a second formula (2).

In a possible implementation, the first search segment is the 1st search segment, and the search range determining module 11 may be configured to: for a Kth search segment, where $1<K \leqslant N$, and N represents the number of search segments, determine whether the Kth search segment is earlier than the first search segment based on the preset search rule; if the Kth search segment is earlier than the first search segment, calculate according to a third formula (3) and a fourth formula (4) to obtain the begin time and the end time of the Kth search segment respectively; if the Kth search segment is later than the first search segment, calculate according to a fifth formula (5) and a sixth formula (6) to obtain the begin time and the end time of the Kth search segment respectively.

Figure 8:
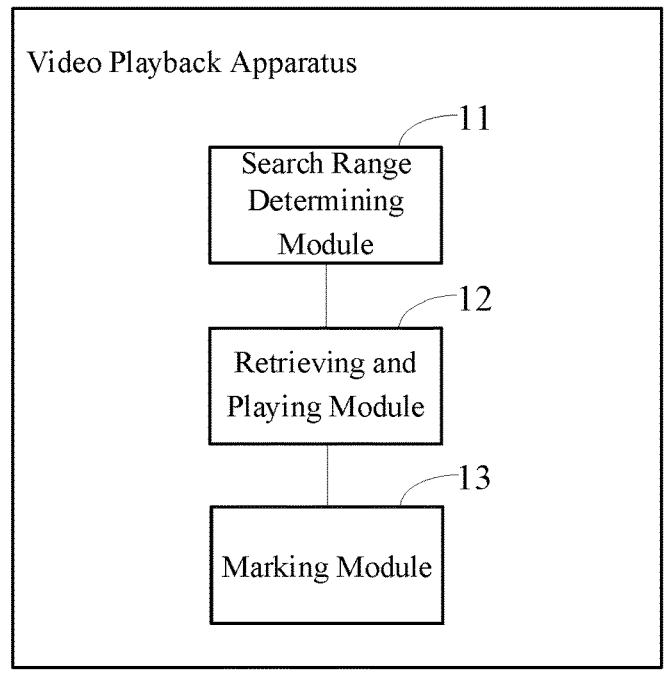
FIG. 8 is a block diagram of a second structure of a video playback apparatus according to an embodiment of the disclosure.

In a possible implementation, as shown in FIG. 8, the video playback apparatus may further include a marking module 13. The marking module 13 is configured to, after the time range of the initial incremental search is determined, mark a state of each of the search segments as one of searched, being searched, or unsearched.

Figure 9:
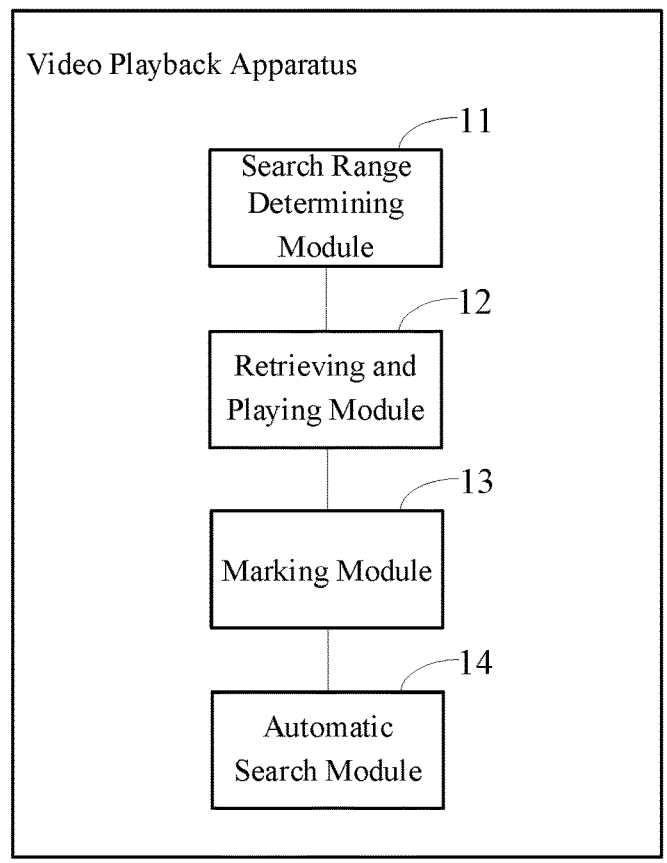
FIG. 9 is a block diagram of a third structure of a video playback apparatus according to an embodiment of the disclosure.

In a possible implementation, as shown in FIG. 9, the video playback apparatus may further include an automatic search module 14. The automatic search module 14 is configured to perform a search on a search segment marked as being searched at a predetermined time interval, and update the video file in the search segment after the search is completed.

Figure 10:
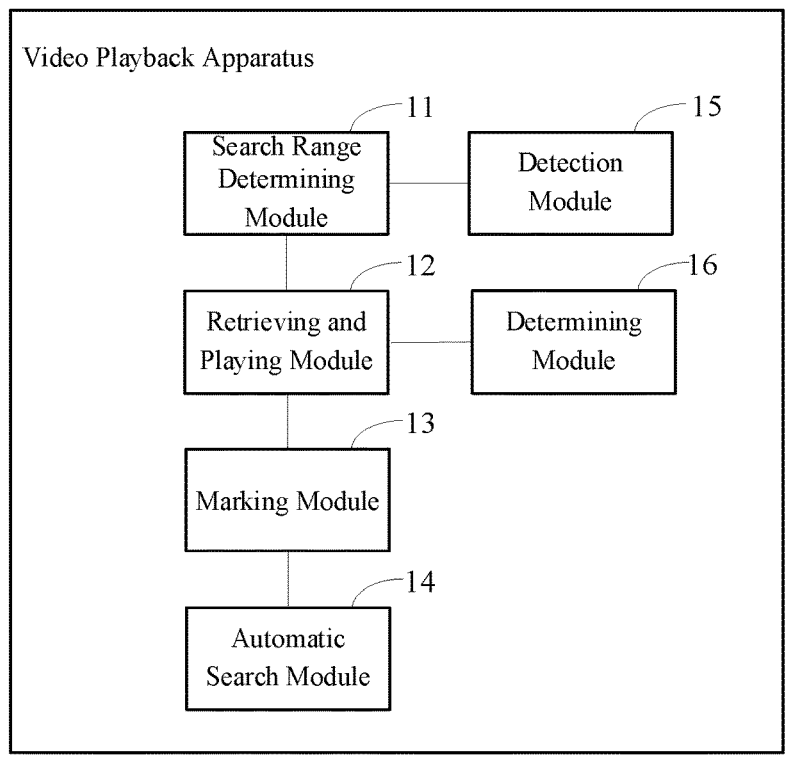
FIG. 10 is a block diagram of a fourth structure of a video playback apparatus according to an embodiment of the disclosure.

In a possible implementation, as shown in FIG. 10, the video playback apparatus may further include: a detection module 15 and a determining module 16.

The detection module 15 may be configured to determine a critical timing for triggering a new incremental search, and detect whether a relocated playback timing exceeds the critical timing.

The search range determining module 11 may be further configured to, when the relocated playback timing exceeds the critical timing, determine a time range of the new incremental search according to the relocated playback timing and the preset search parameter.

The determining module 16 may be configured to determine whether an intersection exists between the time range of the new incremental search and the time range of a previous incremental search.

The retrieving and playing module 12 may be further configured to, when the intersection exists, retrieve a video file from a relocated search segment that has not been searched according to the preset search rule; when the intersection does not exist, retrieve a video file from all relocated search segments according to the preset search rule.

Figure 11:
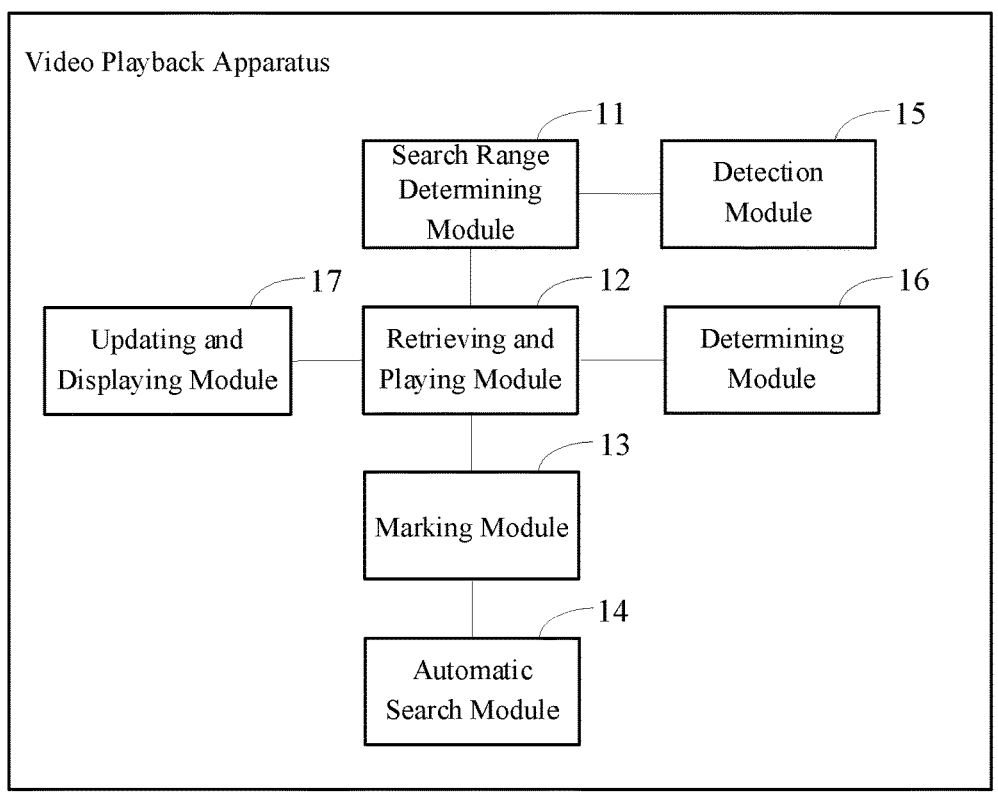
FIG. 11 is a block diagram of a fifth structure of a video playback apparatus according to an embodiment of the disclosure.

In a possible implementation, as shown in FIG. 11, the video playback apparatus may further include an updating and displaying module 17. The updating and displaying module 17 is configured to, after a search on a search segment is completed, update a video bar of the search segment and display the updated video bar on a user interface.

For the implementation process of the functions and effects of each unit in the video playback apparatus, reference may be made to the implementation process of the corresponding steps in the method, which will not be repeated here.

For the apparatus embodiments, since it basically corresponds to the method embodiments, reference may be made to the part of the description of the method embodiments for related parts. The apparatus embodiments described above is merely illustrative. The units described as separate components may or may not be physically separated, and the components displayed as units may or may not be physical units. That is, they may be located in one place, or may be distributed to multiple network units. Some or all of the modules may be selected according to actual needs to achieve the objectives of the solution of the present disclosure. Those of ordinary skill in the art may understand and implement it without creative work.

Based on the same inventive concept, an embodiment of the present disclosure also provide a computer-readable storage medium storing a computer program thereon, and when the computer program is executed by a processor, the computer program causes the processor to perform the operations including: determining a time range for an initial incremental search according to a target playback timing and a preset search parameter, wherein the time range includes at least two search segments; and retrieving a video file in each of the at least two search segments in a search sequence determined according to a preset search rule in a way that, when a video file is retrieved from one of the at least two search segments, determining whether the video file satisfies a playback condition, when the video file satisfies the playback condition, playing the video file, and when retrieving video file from one of the search segments is completed, continuing to retrieve a video file from a remaining search segment that has not been searched in the search sequence.

In a possible implementation, the search parameter may include a number of search segments and a duration of a search segment. Determining the time range for the initial incremental search may include: determining, based on the target playback timing and the preset duration of search segment, a begin time and an end time of a first search segment where the target playback timing is located; and determining, according to the begin time and the end time of the first search segment, the preset number of search segments, the preset duration of search segment and the preset search rule, a begin time and an end time of the remaining search segment.

In a possible implementation, the preset search rule indicates that the first search segment is taken as a center, and the search segments are to be searched in a crossing order of first rightward and then leftward, or he preset search rule indicates that the first search segment is taken as a center, and the search segments are to be searched in a crossing order of first leftward and then rightward.

In a possible implementation, determining the begin time and the end time of the first search segment where the target playback timing is located may include: obtaining the begin time of the first search segment based on a first formula (1); and obtaining the end time of the first search segment based on a second formula (2).

In a possible implementation, the first search segment may be the 1st search segment, and determining the begin time and the end time of the remaining search segment may include: for a Kth search segment, where $1K \leq N$, and N represents the number of search segments, determining whether the Kth search segment is earlier than the first search segment based on the preset search rule. When the Kth search segment is earlier than the first search segment, obtaining the begin time and the end time of the Kth search segment based on a third formula (3) and a fourth formula (4) respectively. When the Kth search segment is later than the first search segment, obtaining the begin time and the end time of the Kth search segment based on a fifth formula (5) and a sixth formula (6) respectively.

In a possible implementation, when the computer program is executed by the processor, the computer program may also cause the processor to perform operations including: after determining the time range of the initial incremental search, marking a state of each of the search segments as one of searched, being searched, or unsearched, performing a search on a search segment marked as being searched at a predetermined time interval, and updating the video file in the search segment after the search is completed.

In a possible implementation, when the computer program is executed by the processor, the computer program may further cause the processor to perform operations including: determining a critical timing for triggering a new incremental search; detecting whether a relocated playback timing exceeds the critical timing; when the relocated playback timing exceeds the critical timing, determining a time range of the new incremental search according to the relocated playback timing and the preset search parameter; determining whether an intersection exists between the time range of the new incremental search and the time range of a previous incremental search; when the intersection exists, retrieving a video file from a relocated search segment that has not been searched according to the preset search rule; and when the intersection does not exist, retrieving a video file from all relocated search segments according to the preset search rule.

In a possible implementation, when the computer program is executed by the processor, the computer program may further cause the processor to perform operations including: after a search on a search segment is completed, updating a video bar of the search segment and displaying the updated video bar on a user interface.

Optionally, the storage medium may specifically be a memory.

Figure 12:
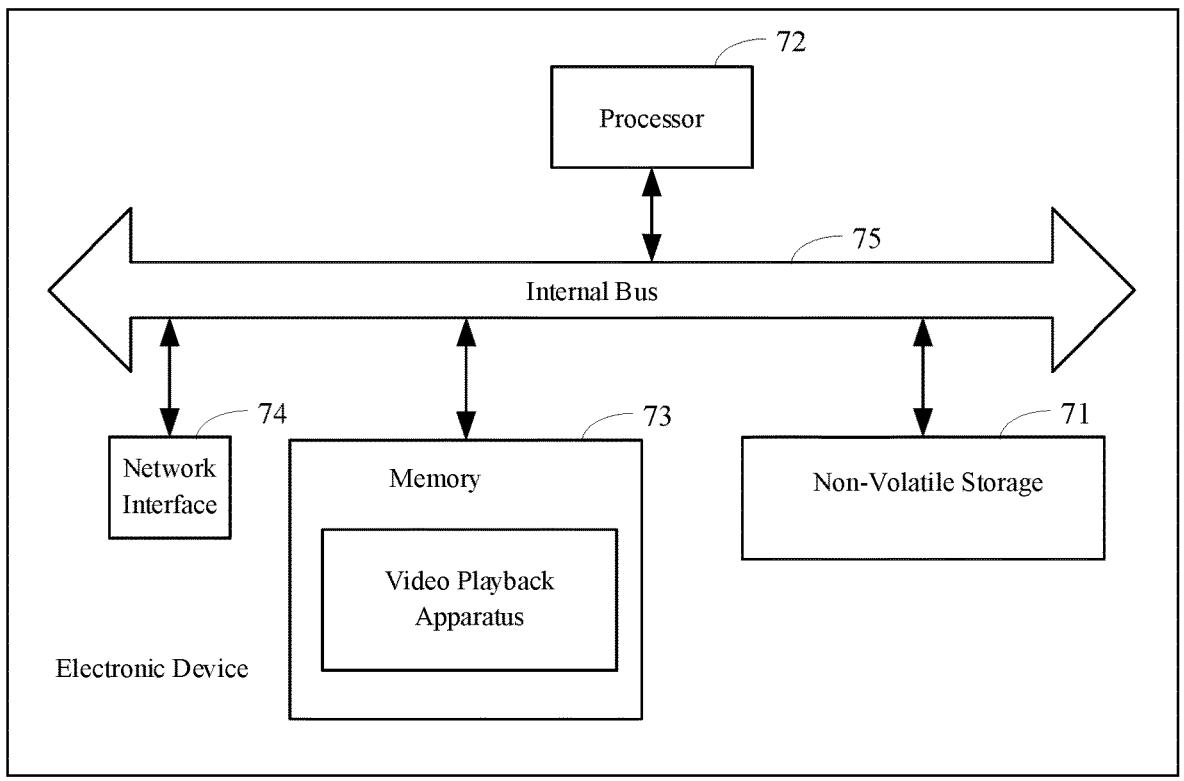
FIG. 12 is a block diagram of an electronic device according to an embodiment of the disclosure.

Based on the same inventive concept, referring to FIG. 12, an embodiment of the present disclosure also provides an electronic device, which may include a storage 71 (for example, a non-volatile storage), a processor 72, and a computer program stored on the storage 71 and executable by the processor 72. When the processor 72 executes the program, the processor 72 implements the steps of the video playback method in any of the above possible implementations.

As shown in FIG. 12, the electronic device generally may further include: a memory 73, a network interface 74 and an internal bus 75. In addition to these components, other hardware may also be included, which will not be repeated here.

It should be noted that the above video playback apparatus may be implemented by software. As a logical apparatus, it is implemented by the processor 72 of the electronic device where it is located reading the computer program instructions stored in the non-volatile storage into the memory 73 to execute the computer program instructions.

The embodiments of the subject matter and functional operations described in this specification may be implemented in the following: digital electronic circuits, tangible computer software or firmware, computer hardware including the structures disclosed in this specification and their structural equivalents, or a combination of one or more of them. The embodiments of the subject matter described in this specification may be implemented as one or more computer programs, that is, one or more modules of computer program instructions encoded on a tangible non-transitory program carrier to be executed by a data processing device or to control the operation of the data processing device. Alternatively or additionally, the program instructions may be encoded on artificially generated propagated signals, such as machine-generated electrical, optical or electromagnetic signals, which are generated to encode information and transmit it to a suitable receiver device to be executed by the data processing device. The computer storage medium may be a machine-readable storage device, a machine-readable storage substrate, a random or serial access memory device, or a combination of one or more of them.

The processing and logic flow described in this specification may be executed by one or more programmable computers executing one or more computer programs to perform corresponding functions by operating according to input data and generating output. The processing and logic flow may also be executed by a dedicated logic circuit, such as FPGA (Field Programmable Gate Array) or ASIC (Application Specific Integrated Circuit), and the device may also be implemented as a dedicated logic circuit.

Computers suitable for executing computer programs include, for example, general-purpose and/or special-purpose microprocessors, or any other type of central processing unit. Generally, the central processing unit receives instructions and data from a read-only memory and/or random access memory. The basic components of a computer include a central processing unit for implementing or executing instructions and one or more memory devices for storing instructions and data. Generally, a computer also includes one or more mass storage devices for storing data, such as magnetic disks, magneto-optical disks, or optical disks, or the computer is operatively coupled to this mass storage device to receive data from it or transmit data to it, or both. However, the computer does not have to have such equipment. In addition, the computer may be embedded in another device, such as a mobile phone, a personal digital assistant (PDA), a mobile audio or video player, a game console, a global positioning system (GPS) receiver, or a universal serial bus (USB) flash drives are portable storage devices, to name a few.

Computer-readable media suitable for storing computer program instructions and data include all forms of non-volatile memories, media and memory devices, including, for example, semiconductor memory devices (such as erasable programmable read-only memory (EPROM), electronic Erasable programmable read-only memory (EEPROM) and flash memory devices), magnetic disks (such as internal hard disks or removable disks), magneto-optical disks and compact disk read-only memories (CD-ROMs) and digital versatile disk read-only memories (DVD-ROMs). The processor and the memory may be supplemented by or incorporated into a dedicated logic circuit.

Although this specification contains many specific implementation details, these should not be construed as limiting the scope of any invention or the scope of protection, but are mainly configured to describe the features of specific embodiments of a particular invention. Certain features described in multiple embodiments in this specification may also be implemented in combination in a single embodiment. On the other hand, various features described in a single embodiment may also be implemented in multiple embodiments separately or in any suitable sub-combination. In addition, although features may function in certain combinations as described above and even initially claimed as such, one or more features from the claimed combination may be removed from the combination in some cases. The combination of protection may be directed to a sub-combination or a variant of the sub-combination.

Similarly, although operations are depicted in a specific order in the drawings, this should not be understood as requiring these operations to be performed in the specific order shown or performed sequentially, or requiring all the operations illustrated to be performed to achieve the desired result. In some cases, multitasking and parallel processing may be advantageous. In addition, the separation of various system modules and components in the foregoing embodiments should not be understood as requiring such separation in all embodiments, and it should be understood that the described program components and systems may usually be integrated together in a single software product, or packaged into multiple software products.

Thus, specific embodiments of the subject matter have been described. Other embodiments are within the scope of the appended claims. In some cases, the actions recited in the claims may be performed in a different order and still achieve desired results. In addition, the processes depicted in the drawings are not necessarily in the specific order or sequential order shown in order to achieve the desired result. In some implementations, multitasking and parallel processing may be advantageous.

The above descriptions are only some embodiments of the disclosure, and are not intended to limit the present disclosure. Any modification, equivalent replacement, improvement, etc. made within the spirit and principle of the present disclosure shall be included in the protection scope of the present disclosure.

What is claimed is:

1. A video playback method, comprising:
    determining a time range for an initial incremental search according to a target playback timing and a preset search parameter, wherein the time range includes at least two search segments that comprise a first search segment where the target playback timing is located; and
    retrieving a video file in each of the at least two search segments in a search sequence determined according to a preset search rule in a way that
        when a video file is retrieved from one of the at least two search segments, determining whether the video file satisfies a playback condition,
        when the video file satisfies the playback condition, playing the video file, and
        when retrieving video file from one of the at least two search segments is completed, continuing to retrieve a video file from a remaining search segment that has not been searched in the search sequence,
    wherein the preset search rule indicates one of:
        the first search segment is taken as a center, and the at least two search segments are to be searched in a crossing order of first rightward and then leftward, or
        the first search segment is taken as a center, and the at least two search segments are to be searched in a crossing order of first leftward and then rightward,
    wherein the search parameter comprises a preset number of search segments and a preset duration of search segment, and
    wherein determining the time range for the initial incremental search according to the target playback timing and the preset search parameter comprises:
        determining, based on the target playback timing and the preset duration of search segment, a begin time and an end time of the first search segment and
        determining, according to the begin time and the end time of the first search segment, the preset number of search segments, the preset duration of search segment and the preset search rule, and a begin time and an end time of the remaining search segment.

2. The method according to claim 1, wherein determining, based on the target playback timing and the preset duration of search segment, the begin time and the end time of the first search segment comprises:
    obtaining the begin time of the first search segment based on a first formula as follows:

$$\text{PlayTimeBegin} = \lfloor (\text{hours of PlayTime})/M \rfloor * M;$$

obtaining the end time of the first search segment based on a second formula as follows:

$$\text{PlayTimeEnd} = \lfloor (\text{hours of PlayTime})/M \rfloor * M + M,$$

where PlayTimeBegin represents the begin time of the first search segment, PlayTimeEnd represents the end time of the first search segment,
    PlayTime hours represents a hour reading of the target playback timing,
    M represents the preset duration of search segment, and
    $\lfloor \ldots \rfloor$ represents an operation of rounding down.

3. The method according to claim 1, wherein the first search segment is 1st search segment, and determining, according to the begin time and the end time of the first search segment, the preset number of search segments, the preset duration of search segment and the preset search rule, the begin time and the end time of the remaining search segment comprises:
    for a Kth search segment, where $1<K\le N$, and N represents the preset number of search segments, determining whether the Kth search segment is earlier than the first search segment based on the preset search rule;

if the Kth search segment is earlier than the first search segment, obtaining the begin time and the end time of the Kth search segment based on a third formula and a fourth formula as follows:

the begin time of the Kth search segment=PlayTimeBegin−⌊K/2⌋*M;

the end time of the Kth search segment=PlayTimeBegin−(⌊K/2⌋−1)*M;

if the Kth search segment is later than the first search segment, obtaining the begin time and the end time of the Kth search segment based on a fifth formula and a sixth formula as follows:

the begin time of the Kth search segment=PlayTimeEnd+(⌊K/2⌋−1)*M;

the end time of the Kth search segment=PlayTimeEnd+⌊K/2⌋*M, wherein where PlayTimeBegin represents the begin time of the first search segment,
PlayTimeEnd represents the end time of the first search segment,
M represents the preset duration of search segment, and
⌊ . . . ⌋ represents an operation of rounding down.

4. The method according to claim 1, further comprising:
after determining the time range of the initial incremental search, marking a state of each of the at least two search segments as one of searched, being searched, or unsearched;
performing a search on a search segment marked as being searched at a predetermined time interval; and
updating the video file in the search segment after the search is completed.

5. The method according to claim 1, further comprising:
determining a critical timing for triggering a new incremental search;
detecting whether a relocated playback timing exceeds the critical timing;
if the relocated playback timing exceeds the critical timing, determining a time range of the new incremental search according to the relocated playback timing and the preset search parameter;
determining whether an intersection exists between the time range of the new incremental search and the time range of a previous incremental search;
if the intersection exists, retrieving a video file from a relocated search segment that has not been searched according to the preset search rule; and
if the intersection does not exist, retrieving a video file from all relocated search segments according to the preset search rule.

6. The method according to claim 1, further comprising:
after a search on a search segment is completed, updating a video bar of the search segment and displaying the updated video bar on a user interface.

7. A non-transitory computer-readable storage medium storing a computer program that is executable by at least one processor to perform operations comprising:
determining a time range for an initial incremental search according to a target playback timing and a preset search parameter, wherein the time range includes at least two search segments that comprise a first search segment where the target playback timing is located; and
retrieving a video file in each of the at least two search segments in a search sequence determined according to a preset search rule in a way that
when a video file is retrieved from one of the at least two search segments, determining whether the video file satisfies a playback condition,
when the video file satisfies the playback condition, playing the video file, and
when retrieving video file from one of the at least two search segments is completed, continuing to retrieve a video file from a remaining search segment that has not been searched in the search sequence,
wherein the preset search rule indicates one of:
the first search segment is taken as a center, and the at least two search segments are to be searched in a crossing order of first rightward and then leftward, or
the first search segment is taken as a center, and the at least two search segments are to be searched in a crossing order of first leftward and then rightward,
wherein the search parameter comprises a preset number of search segments and a preset duration of search segment, and
wherein determining the time range for the initial incremental search according to the target playback timing and the preset search parameter comprises:
determining, based on the target playback timing and the preset duration of search segment, a begin time and an end time of the first search segment and
determining, according to the begin time and the end time of the first search segment, the preset number of search segments, the preset duration of search segment and the preset search rule, and a begin time and an end time of the remaining search segment.

8. An electronic device comprising:
at least one memory,
at least one processor, and
a computer program stored on the at least one memory and executable by the at least one processor to perform operations comprising:
determining a time range for an initial incremental search according to a target playback timing and a preset search parameter, wherein the time range includes at least two search segments that comprise a first search segment where the target playback timing is located; and
retrieving a video file in each of the at least two search segments in a search sequence determined according to a preset search rule in a way that
when a video file is retrieved from one of the at least two search segments, determining whether the video file satisfies a playback condition,
when the video file satisfies the playback condition, playing the video file, and
when retrieving video file from one of the search segments is completed, continuing to retrieve a video file from a remaining search segment that has not been searched in the search sequence,
wherein the preset search rule indicates one of:
the first search segment is taken as a center, and the at least two search segments are to be searched in a crossing order of first rightward and then leftward, or
the first search segment is taken as a center, and the at least two search segments are to be searched in a crossing order of first leftward and then rightward,
wherein the search parameter comprises a preset number of search segments and a preset duration of search segment, and wherein determining the time range for the initial incremental search according to the target playback timing and the preset search parameter comprises:
determining, based on the target playback timing and the preset duration of search segment, a begin time and an end time of the first search segment and
determining, according to the begin time and the end time of the first search segment, the preset number of search segments, the preset duration of search segment and the preset search rule, and a begin time and an end time of the remaining search segment.

9. The electronic device according to claim 8, the operations comprising:
obtaining the begin time of the first search segment based on a first formula as follows:

$$PlayTimeBegin = \lfloor (PlayTime\ hours)/M \rfloor * M;$$

obtaining the end time of the first search segment based on a second formula as follows:

$$PlayTimeEnd = \lfloor (PlayTime\ hours)/M \rfloor * M + M,$$

where PlayTimeBegin represents the begin time of the first search segment, PlayTimeEnd represents the end time of the first search segment,
PlayTime hours represents a hour reading of the target playback timing,
M represents the preset duration of search segment, and
$\lfloor \ldots \rfloor$ represents an operation of rounding down.

10. The electronic device according to claim 8, the first search segment is 1st search segment, the operations comprising:
for a Kth search segment, where 1<K≤N, and N represents the preset number of search segments, determining whether the Kth search segment is earlier than the first search segment based on the preset search rule;
if the Kth search segment is earlier than the first search segment, obtaining the begin time and the end time of the Kth search segment based on a third formula and a fourth formula as follows:

the begin time of the Kth search segment = PlayTimeBegin − $\lfloor K/2 \rfloor * M$;

the end time of the Kth search segment = PlayTimeBegin − ($\lfloor K/2 \rfloor - 1$)*M; and if the Kth search segment is later than the first search segment, obtaining the begin time and the end time of the Kth search segment based on a fifth formula and a sixth formula as follows:

the begin time of the Kth search segment = PlayTimeEnd + ($\lfloor K/2 \rfloor - 1$)*M;

the end time of the Kth search segment = PlayTimeEnd + $\lfloor K/2 \rfloor * M$, where PlayTimeBegin represents the begin time of the first search segment,
PlayTimeEnd represents the end time of the first search segment,
M represents the preset duration of search segment, and
$\lfloor \ldots \rfloor$ represents an operation of rounding down.

11. The electronic device according to claim 8, the operations comprising:
after determining the time range of the initial incremental search, marking a state of each of the at least two search segments as one of searched, being searched, or unsearched;
performing a search on a search segment marked as being searched at a predetermined time interval, and
updating the video file in the search segment after the search is completed.

12. The electronic device according to claim 8, the operations comprising:
determining a critical timing for triggering a new incremental search;
detecting whether a relocated playback timing exceeds the critical timing;
if the relocated playback timing exceeds the critical timing, determining a time range of the new incremental search according to the relocated playback timing and the preset search parameter;
determining whether an intersection exists between the time range of the new incremental search and the time range of a previous incremental search;
if the intersection exists, retrieving a video file from a relocated search segment that has not been searched according to the preset search rule; and
if the intersection does not exist, retrieving a video file from all relocated search segments according to the preset search rule.

13. The electronic device according to claim 8, the operations comprising:
after a search on a search segment is completed, updating a video bar of the search segment and displaying the updated video bar on a user interface.

\* \* \* \* \*